June 4, 1940. J. H. REOHR 2,202,868
NUT LOCK
Original Filed March 29, 1935 2 Sheets-Sheet 1

INVENTOR
John H. Reohr.
BY
Lewis J. Doolittle
ATTORNEY.

June 4, 1940.  J. H. REOHR  2,202,868
NUT LOCK
Original Filed March 29, 1935   2 Sheets-Sheet 2
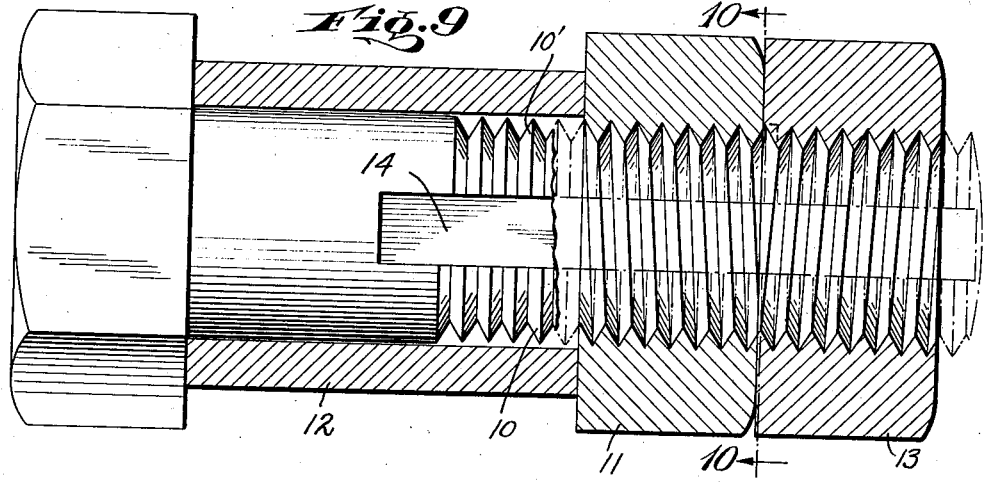
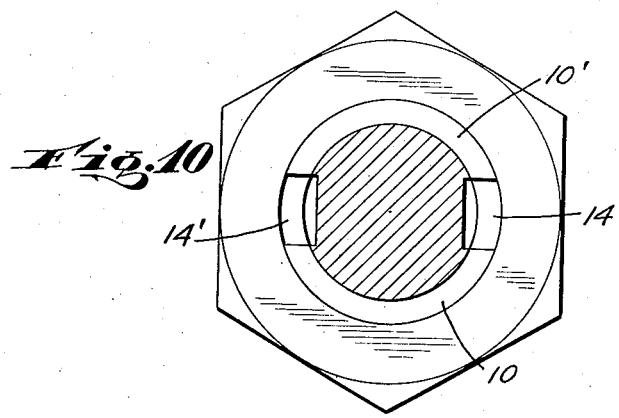
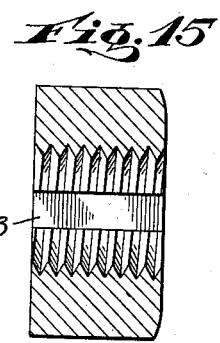
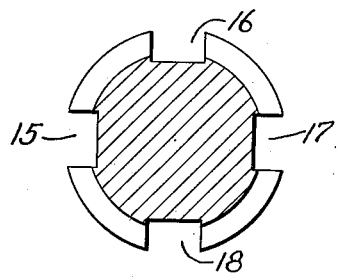
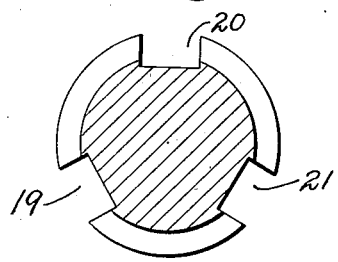
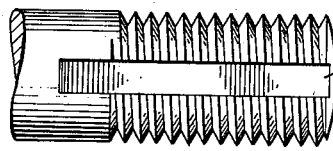
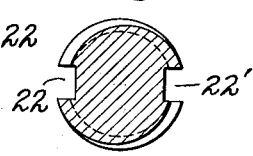
INVENTOR
John H. Reohr,
BY
Lewis J. Doolittle
ATTORNEY.

Patented June 4, 1940

2,202,868

UNITED STATES PATENT OFFICE 2,202,868

NUT LOCK

John H. Reohr, Jamaica, N. Y., assignor of one-half to Erling C. Olsen, New York, N. Y.; Bertha Elizabeth Reohr executrix of said John H. Reohr, deceased Application March 29, 1935, Serial No. 13,591
Renewed August 11, 1939

10 Claims. (Cl. 151—22)

This invention relates to a novel construction for a bolt, stud or other male member intended for threaded connection with a female member or nut. Also, the invention may be embodied in the said female member, the object being to provide a construction which forms a self-locking arrangement for said members.

A further object of the invention is to provide a construction for either the male or female member which permits it to be used with either a standard right-hand thread or a standard left-hand thread on the other member. That is, if the nut is constructed or formed according to the invention the same nut may be used with either a right-hand, or left-hand threaded bolt or stud of standard construction. Also, if the bolt or stud is constructed or formed according to the invention either a right-hand or left-hand threaded nut, or both, may be used on the same bolt or stud, as will be understood more clearly from the description of the embodiment of the invention illustrated in the accompanying drawings.

In the drawings, in which several forms or embodiments of the invention are illustrated, like parts in the several views have been given the same reference numeral.

Fig. 9 is a sectional view of a bolt which is constructed to embody the invention and upon which standard right-hand and left-hand nuts are engaged and interlocked.

Fig. 10 is a sectional view on the line 10—10 of Fig. 9.

Figs. 11 and 12 are sectional views showing modifications of the invention as applied to a bolt, stud or other male member.

Fig. 13 is an elevation of the end portion of a bolt, stud or other male member with a standard thread.

Fig. 14 is a transverse sectional view of Fig. 13.

Fig. 15 is a transverse sectional view of a nut, or other female member, with a standard thread.

Figure 1:
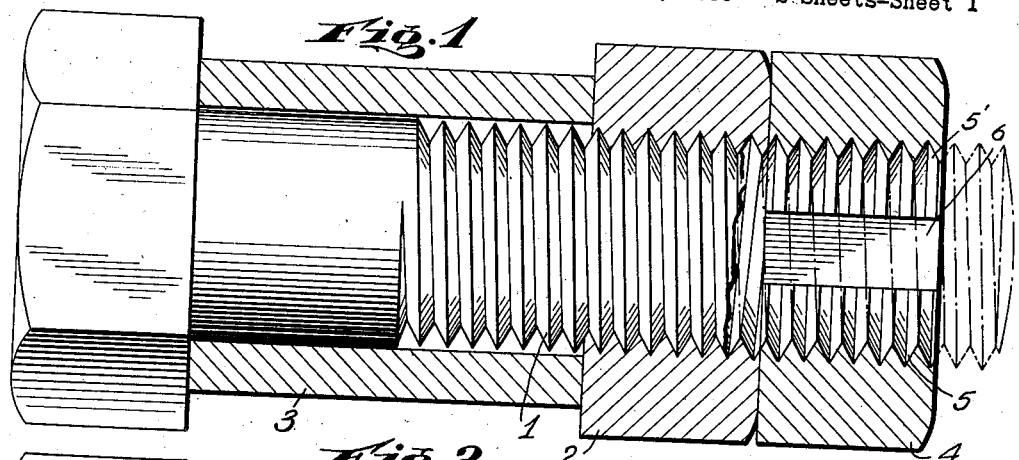
Fig. 1 is a sectional view of a bolt and nut having a standard right-hand thread, with a locking member in the form of a nut embodying the invention.

The invention is illustrated in the drawings as applied to an ordinary bolt and nut. In Fig. 1 the standard right-hand threaded bolt is shown at 1 with a standard right-hand threaded nut 2 engaged thereon, abutting against a sleeve, or other part to be held thereby, shown at 3. A locking member 4 is shown engaged with the threaded portion 1 of the bolt, in the same manner as the standard nut 2. The threaded portion of this locking member is composed of a series of parallel annular grooves, each corresponding in cross-section with the cross-section of the standard thread 1, as shown at 5—5' on the interior of the locking member 4. These annular grooves are interrupted circumferentially by a plurality of intersecting slots extending transversely thereof, one of such slots being shown at 6, and the annular grooves terminating in opposite sides of said intersecting slots are off-set longitudinally from each other, as shown at 5 and 5' on opposite sides of the slot 6. In the form shown in Fig. 1, two of these intersecting slots are provided on opposite sides of the interior of the locking member 4 and the annular grooves 5 and 5' are offset so that the tops of the walls separating the grooves 5 are opposite the bottoms of the adjacent grooves 5', as shown in Fig. 1.

Figure 3:
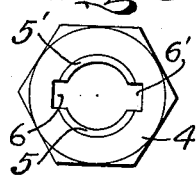
Fig. 3 is an end view or elevation of one form of the locking member, drawn to a smaller scale.
Figure 4:
Fig. 4 is a development of the interior of the locking member shown in Fig. 3.

The shank of the bolt 1 is shown as broken away inside the standard nut 2 so that the thread of the nut 2 and the annular grooves of the locking member 4 are seen in full lines, with the end of the bolt 1 indicated in dot-and-dash lines. It will be seen from the drawings (Fig. 1) that the standard spiral threads 1 cross from the grooves 5 on one side of the slots 6 to the next offset grooves 5' on the opposite side of the slots. Consequently, as the locking member 4 is turned in a right-hand direction on the bolt threads 1 it is advanced in the same manner as a nut with a standard spiral thread, such as the nut 2; and as it is engaged against this nut the end portions of the walls of the annular grooves, 5 and 5', adjacent the slots 6 are forced slightly out of exact or normal alinement and the spiral thread of the bolt is engaged tightly on both sides against the end portions of opposite walls of the grooves of the locking member, which produces a locking action and frictional resistance against loosening of the same on the bolt. This distortion of the annular grooves is indicated in the development of the interior of the locking member as shown in Figs. 3 and 4. The forcing out of their normal alinement of the walls of grooves 5 is indicated at 5a and 5d and of the grooves 5' at 5b and 5c, on opposite sides of the slots 6.

Figure 2:
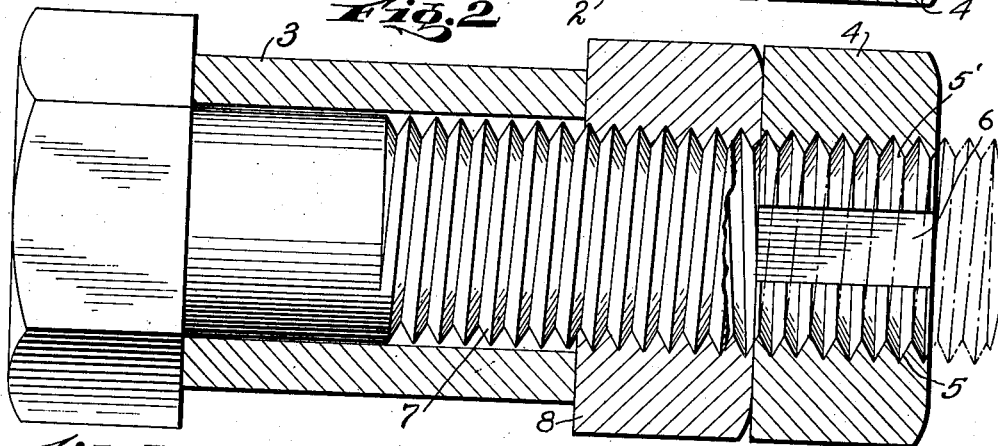
Fig. 2 is a sectional view, similar to Fig. 1, except that the bolt and nut have a standard left-hand thread, with a locking member in the form of a nut which is the same as shown in Fig. 1.

In Fig. 2 is shown a bolt and nut, similar to Fig. 1, except that the same is provided with a standard left-hand thread. The locking member 4, however, is the same in every respect as shown and described in connection with Fig. 1 and, on account of the construction with the annular grooves and intersecting slots, the same locking member may be used with either a right-hand or left-hand thread, as will be seen by examination of Figs. 1 and 2. The left-hand threads 7 shown in Fig. 2 cross from the grooves 5 on one side of the slots 6 to the offset grooves 5' on the opposite side of the slots, as indicated by the dot-and-dash lines. This feature makes the same locking member available for use with either right or left-hand threads.

In Fig. 9 the locking member is provided by the construction of the bolt with the series of parallel annular grooves each corresponding in cross-section with the cross-section of a standard spiral thread, such as shown by the right and left-hand nuts, 11 and 13, respectively. The parallel annular grooves, 10—10', on the bolt are interrupted or intersected by the transverse longitudinal slots 14—14' (Figs. 9–10) and the grooves terminating in opposite sides of these slots are offset from each other, as shown at 10 and 10' on opposite sides of the slot 14, so that the tops of the walls separating the grooves 10 are opposite the bottoms of the opposite grooves 10', the bolt being broken away so as to show the standard threads, both right-hand and left-hand, of the nuts 11 and 13, respectively, as engaged with the same annular grooved bolt, which is indicated by the dot-and-dash lines in Fig. 9. The nuts are engaged against each other and against the sleeve, or other member to be held, indicated at 12, and when so engaged will be interlocked in the same manner as described for the standard bolt and locking member which takes the place of the nut, or of one of the standard nuts, as shown and described.

In Fig. 11, the annular grooved bolt is provided with four intersecting slots, 15, 16, 17 and 18, separating the grooves into four sections instead of two, as shown in Fig. 10. In Fig. 12, three of these slots intersecting the annular grooved bolt are shown at 19, 20 and 21.

In Figs. 13 and 14 a threaded member with a standard thread is shown, which threaded portion is intersected and separated by oppositely positioned slots extending transversely of the threads, as shown at 22—22'. This permits the threads to be formed by die-casting or punching and removes or avoids the ridge formed between the two portions of the dies. In Fig. 15 the slot 23 performs the same function with a die-formed nut with a standard thread, as will be understood from the drawings.

Figure 5:
Fig. 5 and Fig. 6 are, respectively, an end view and development of modifications of the locking member.
Figure 6:
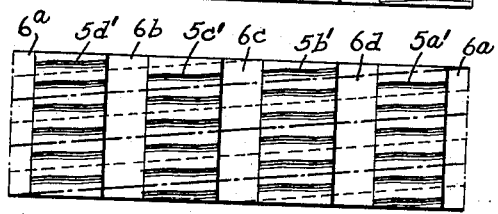
Figure 7:
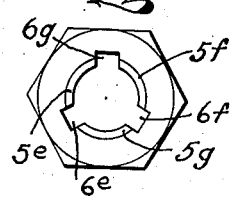
Figs. 7 and 8 show another modification of the same.
Figure 8:
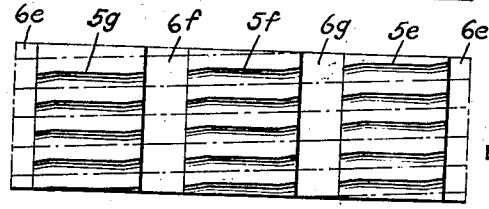

Several different arrangements of the slots intersecting the annular grooves of the locking member are illustrated in Figs. 3 to 8, Figs. 3, 5 and 7 being elevations or end views of the locking members, which in these illustrations is in the general form of a nut, while Figs. 4, 6 and 8 are developments of the interior of the said locking members.

In Figs. 3 and 4 the slots 6 and 6' are positioned diametrically opposite each other and illustrate the form of locking member shown at 4 in Figs. 1 and 2. The walls 5 and 5' are the walls separating the annular grooves intersected by the slots 6 and 6', the grooves on opposite sides of the locking member 4 being offset with relation to each other so that the tops of the walls separating the grooves on one side are opposite the bottom of the grooves on the opposite side, as shown at 5 and 5' in Fig. 4. As previously mentioned, when the locking member is turned on the standard thread of the bolt (1 or 7 in Figs. 1 and 2) the extreme outer ends of the separating walls 5 and 5' are forced slightly out of their normal alinement (as indicated, in somewhat exaggerated form, at 5a and 5d for the wall 5 and at 5b and 5c for wall 5' in Fig. 4) providing an increased frictional resistance between the locking member and threaded portion of the bolt and preventing the loosening of the same thereon and tending to grip the threads of the bolt on both sides of the several threads and on opposite sides of the slots, 6 and 6', as will be seen by reference to Fig. 4.

In Figs. 5 and 6 a similar locking member is shown, in which four slots are provided instead of two. In this arrangement the annular grooves and separating walls between the slots 6a and 6b are the same in longitudinal positioning as the slots between the slots 6c and 6d and the grooves between the slots 6b and 6c are the same as those between slots 6d and 6a. That is, the separating walls of the annular grooves 5d' and 5b' are duplicates and 5c' and 5a' are likewise duplicates.

This arrangement as shown in Figs. 5 and 6 is adapted for use with a standard double thread, one of which standard threads is indicated by the dot-and-dash lines and the other by the dotted line.

In Figs. 7 and 8 another arrangement of the annular grooves on the interior of a locking member is shown. In this arrangement three slots, 6e, 6f and 6g are shown, symmetrically positioned circumferentially and intersecting the annular grooves, 5g, 5f and 5e, respectively. In this arrangement, the adjacent grooves and separating walls are offset each one-third of the distance between adjoining grooves. That is, the walls of the grooves 5f are offset longitudinally one-third of the separation distance between adjoining walls of the grooves 5g and, likewise, the walls of the grooves 5e are offset two-thirds of the separation distance between adjoining walls of the grooves 5f. In other words, successive groups of annular grooves, taken circumferentially, are spaced one-third of the distance separating adjoining grooves of any one group, as will be seen by reference to Fig. 8.

It will thus be seen that the series of annular grooves with which the locking member, either male or female member, is provided is composed of a plurality of arcuate portions, each offset longitudinally or axially from its circumferentially adjacent portion, forming an interrupted annular groove, or series of parallel annular grooves, with which a standard spirally threaded member is engaged with opposite ends of the said arcuate portions of the walls of the grooves engaging opposite sides of the spiral thread, the standard spiral thread advancing progressively through said annular grooves successively at said intersecting slots, as illustrated, for instance, in Fig. 4, where the opposite ends 5b and 5c of the wall 5' of that particular arcuate portion of the groove engage opposite sides of the standard spiral thread, indicated by the dot-and-dash lines, and provides an efficient binding or locking action between the said threaded portion and locking member.

What I claim is:

1. A locking member of the class described, which is provided with a series of parallel annular grooves interrupted circumferentially by an intersecting slot extending transversely thereof, each of said annular grooves corresponding in cross-section with the cross-section of a standard spiral thread, with which said locking member is adapted to be engaged and advanced by relative complete rotation thereof, the end portions of the walls of said annular grooves being adapted to be forced slightly out of normal alinement when engaged by said standard thread.

2. A locking member of the class described, which is provided with a series of parallel annular grooves interrupted circumferentially by a plurality of intersecting slots extending transversely thereof, each of said annular grooves corresponding in cross-section with the cross-section of a standard thread, with which said locking member is adapted to be engaged and advanced by relative complete rotation thereof, the end portions of the walls of said annular grooves being adapted to be forced slightly out of normal alinement when engaged by said standard thread.

3. A locking member of the class described, which is provided with a series of annular parallel grooves interrupted circumferentially by a plurality of intersecting slots extending transversely thereof, the grooves terminating in opposite sides of each of said intersecting slots being offset from each other, each of said annular grooves corresponding in cross-section with the cross-section of a standard spiral thread, with which said locking member is adapted to be engaged and advanced by relative rotation thereof.

4. A locking member of the class described which is provided with a series of annulated grooves extending circumferentially thereon and comprising a plurality of arcuate portions each offset longitudinally from its circumferentially adjacent portion and adapted to be engaged with a standard spiral threaded member with opposite ends of said arcuate portions engaging opposite sides of said spiral thread.

5. A locking member of the class described which is provided with a series of annulated grooves extending circumferentially thereon and comprising a plurality of arcuate portions separated by longitudinal slots and each portion being offset longitudinally from its circumferentially adjacent portion and adapted to be engaged with a standard spiral threaded member with opposite ends of said arcuate portions on opposite sides of said longitudinal slots engaging opposite sides of said spiral thread.

6. A locking member of the class described which is provided with a series of annulated grooves extending circumferentially thereon and comprising a plurality of arcuate portions each offset longitudinally from its circumferentially adjacent portion, the ends of said arcuate portions of the walls of said annulated grooves being forced slightly out of their normal alinement when engaged with a co-operating standard spiral threaded member.

7. A locking member of the class described, which is provided with a series of annular parallel grooves interrupted circumferentially by a plurality of intersecting slots extending transversely thereof, the grooves terminating in opposite sides of each of said intersecting slots being offset from each other, each of said annular grooves corresponding in cross-section with the cross-section of a standard spiral thread, with which said locking member is adapted to be engaged and advanced by relative rotation thereof, the standard spiral thread advancing progressively through said annular grooves successively at said intersecting slots.

8. A locking member provided with at least two series of arcuate grooves in parallel planes normal to a line containing the axial centers of the grooves, separating walls between said grooves, a slot parallel to the line containing said axial centers of the grooves and separating the grooves and walls of one series from the grooves and walls of an adjacent series, the ends of said walls adjacent said slot on one side thereof being symmetrically offset with respect to the ends of the walls on the opposite side thereof, said ends of said walls being adapted to be deformed by engagement of said locking member with a helically threaded member to effect an increase of frictional engagement between the said threads and said walls.

9. In combination, a helically threaded member and a locking member for engagement therewith, said locking member having at least two series of slope-sided and sharply ridged arcuate walls, the ridges of the several walls in each series lying in planes parallel to each other and normal to the line containing the axial centers of the walls, a slot separating one series of walls from an adjacent series of walls, the ends of the walls of one series abutting on said slot being symmetrically offset with respect to the ends of the walls of another series abutting on said slot, the walls near their ends abutting said slot being adapted to be deformed by engagement thereof with the threads of the helically threaded member to effect an increase of the frictional engagement between said walls and said threads.

10. A locking member for engagement with a helically threaded member, said locking member having at least two series of slope-sided and sharply ridged coaxial grooves having their centers in the axis of said locking member and their ridges in planes parallel to one another, a slot parallel to said axis and separating the grooves of one series from the grooves of another series, the ends of the walls on one side of said slot being symmetrically offset with respect to the ends of the walls on the opposite thereof to an extent sufficient to enable a helical thread of said helically threaded member to be positioned across said slot and in contact with said walls, the portions of the walls adjacent to the point of contact thereof with said helical thread being adapted to be deformed by such contact to provide an increase of the frictional engagement therebetween.

JOHN H. REOHR.